United States Patent [19]

Hasegawa et al.

[11] Patent Number: 5,293,286
[45] Date of Patent: Mar. 8, 1994

[54] MAGNETIC DISC APPARATUS FOR MAINTAINING AN OPTIMUM HUMIDITY IN A HEAD DISC ASSEMBLY

[75] Inventors: Akihoro Hasegawa; Yoshihiro Terada; Takashi Koshiyama; Hiroyuki Haruyama; Toshio Yasuda, all of Tokyo, Japan

[73] Assignee: NEC Corporation, Tokyo, Japan

[21] Appl. No.: 22,871

[22] Filed: Feb. 25, 1993

Related U.S. Application Data

[63] Continuation of Ser. No. 643,260, Jan. 22, 1991, abandoned.

[30] Foreign Application Priority Data

Jan. 19, 1990 [JP] Japan ................................. 2-9641
Nov. 13, 1990 [JP] Japan ............................... 2-306547

[51] Int. Cl.⁵ .............................................. G11B 33/14
[52] U.S. Cl. ................................................... 360/97.02

[58] Field of Search ................... 360/97.03; 236/44 R

[56] References Cited

U.S. PATENT DOCUMENTS

4,620,248 10/1986 Gitzendanner .................. 360/97.02
4,831,475 5/1989 Kakuda et al. .................. 360/97.03
5,075,807 12/1991 Inoue et al. ..................... 360/97.02

Primary Examiner—John H. Wolff
Attorney, Agent, or Firm—Sughrue, Mion, Zinn, Macpeak & Seas

[57] ABSTRACT

A magnetic disc apparatus has a head disc assembly of enclosed type. A humidity adjustor is operative when a humidity inside the head disc assembly rises above a predetermined humidity degree for absorbing moisture in the enclosed head disc assembly, and is operative when a humidity inside the head disc assembly falls below the predetermined humidity degree for releasing moisture into the enclosed head disc assembly.

8 Claims, 6 Drawing Sheets

MAGNETIC DISC APPARATUS FOR MAINTAINING AN OPTIMUM HUMIDITY IN A HEAD DISC ASSEMBLY

This is a continuation of application Ser. No. 07/643,260 filed Jan. 22, 1991, now abandoned.

BACKGROUND OF THE INVENTION

The present invention relates to magnetic disc apparatuses used for information memory, and particularly relates to a specific type of magnetic disc apparatus designed to maintain an optimum humidity in a head disc assembly.

Conventionally, this type of magnetic disc apparatus generally utilizes a contact-start-stop (C.S.S.) drive. This drive is carried out such that a head for recording and reproducing information contacts a disc medium when it is stationary, and the head floats over the medium through an air film (air bearing) due to an air flow being generated during the rotation of the disc medium so as to effect recording and reproducing. In this drive, the head surface and the medium surface must be maintained flat precisely in order to improve the floating performance of the head and to avoid head clash.

However, when the head disc assembly (hereinafter, H.D.A.) contains air having relatively high humidity, the head tends to cling (i.e., adhere) to the medium when the head surface is placed in contact with the medium surface. This phenomenon has been reported in Japan Lubrication Society, the 33rd Spring Research Conference Brief, 1989, Andou and Miyamoto, "Affect of humidity to frictional characteristic of magnetic disc and slider." For this reason, conventionally desiccant is disposed inside the H.D.A. to remove moisture within the H.D.A. to prevent clinging.

Recently, intensive study has been reported about the relation between the generation of wearing and damage of the medium and the internal humidity of the H.D.A. in various papers such as Japan Lubrication Society, the 33rd Spring Conference Brief, 1989, Kouzu and Yamaguchi, "Influence of testing circumstance on lifetime of magnetic disc", and Japan Lubrication Society, the 34th National Conference, Toyama, Brief, 1989, Katsuno, Ueda and Tanaka, "Wearing and damage of magnetic disc (5)." According to these reports, the interior of the H.D.A. should be preferably maintained at a relatively high humidity in order to suppress wearing and damage of the medium. Namely, an excessively dry condition may cause wearing and damage of the medium.

In the above-noted conventional magnetic disc apparatus, while the interior of the H.D.A. is controlled at an optimum humidity degree during a stationary state to avoid clinging, the interior temperature rises during an operating state so that the relative interior humidity degree decreases to cause wearing and damage of the medium.

Further, when the H.D.A. stops operation, a contact stop is effected while the interior temperature increases and therefore the relative humidity degree is held at a low level. Namely, in the conventional magnetic disc apparatus, the head is made in contact with the medium in quite a low degree of relative humidity, thereby disadvantageously causing wear and damage.

Figure 4:
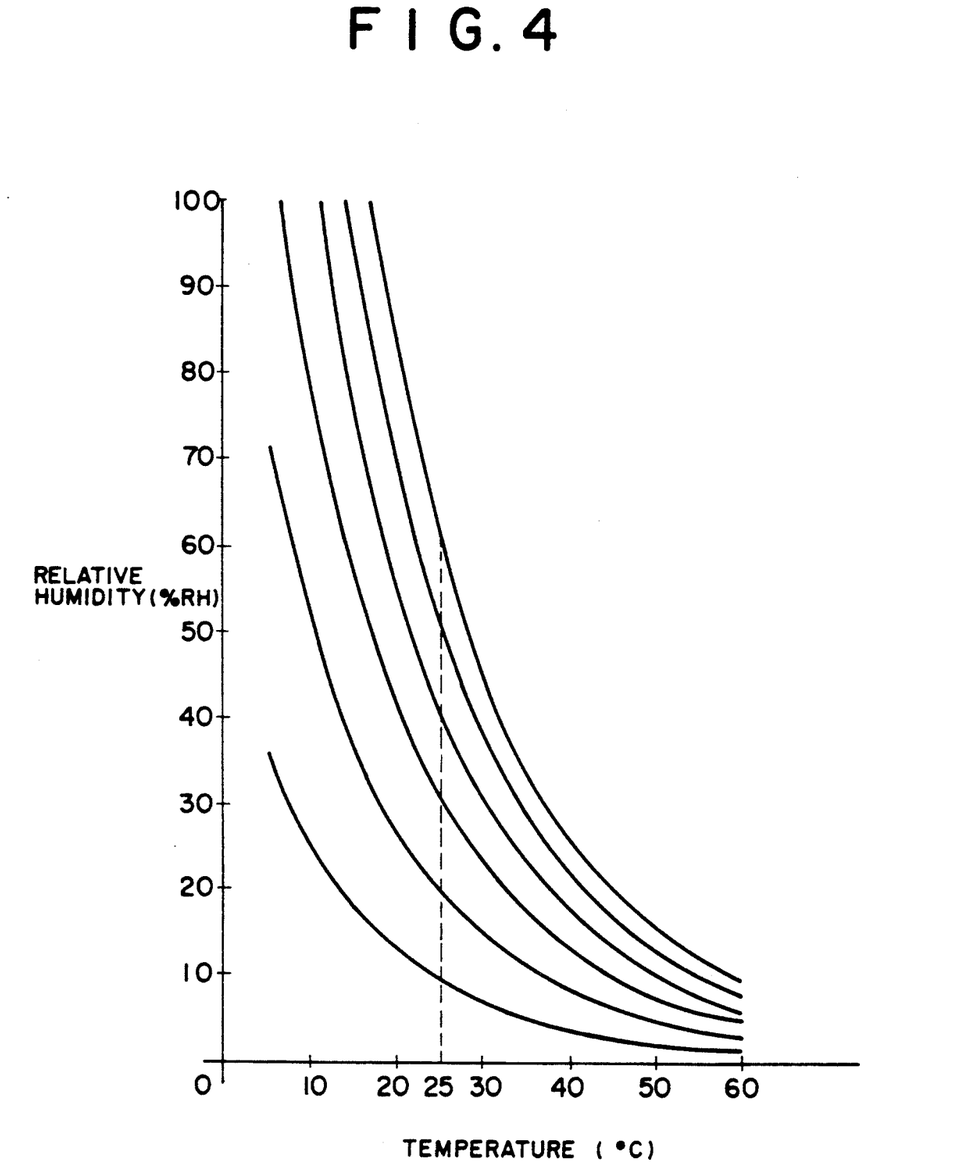
FIG. 4 is a correlation graph between relative humidity and temperature in an enclosed air space.

This phenomenon is qualitatively described hereinbelow with reference to FIG. 4. FIG. 4 shows a change in the degree of relative humidity in a sealed air space in terms of temperature. This sealed situation simulates an enclosed H.D.A. having no desiccant and no intake opening. According to the graph. of FIG. 4, 40% RH of air at a room temperature of 25° C. is changed to 7.5% RH of quite dry air at the operating temperature of the H.D.A., for example, 55° C. Moreover, 60% RH air at the room temperature may be changed to less than 13% RH of air at the operating temperature to produce a considerably dry state. Besides, this air may develop water dew (e.g., moisture) at 15° C., and therefore cannot be used practically. In order to avoid development of water dew, the relative humidity must be set below 20% RH. However, this condition becomes an excessively dry state of less than 5% RH at the operating temperature to cause a dangerous condition. The practical H.D.A. device is actually provided with a breathing filter communicating with the atmosphere, and a desiccant. However, the breathing filter has a moderate flow rate capacity so as to regulate a pressure difference between the interior and the exterior of the closed H.D.A. Hence, it is not sufficient to instantly remove the outstanding dry condition. The desiccant adversely works to develop this dry condition.

SUMMARY OF THE INVENTION

In order to solve the above noted problem, the inventive magnetic disc apparatus is provided with humidity adjusting means operative when the interior humidity of the closed H.D.A. exceeds a predetermined level to absorb moisture and operative when the interior humidity falls below the predetermined level to release moisture.

DETAILED DESCRIPTION OF EMBODIMENTS

Figure 1:
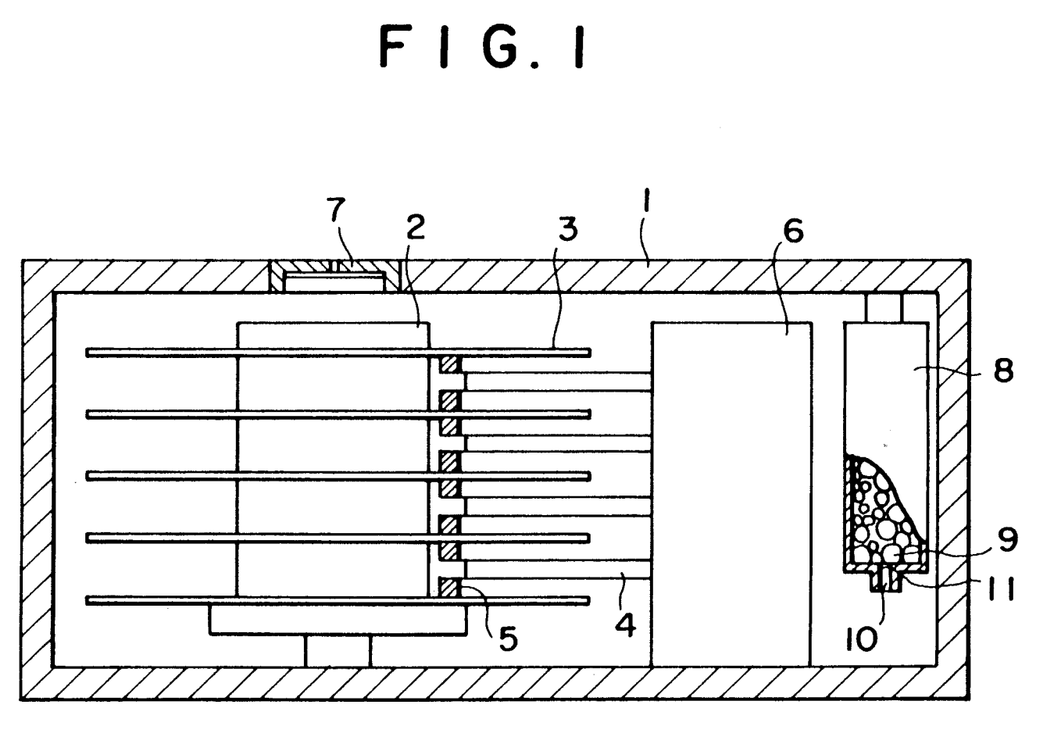
FIG. 1 is a partial front sectional view showing one embodiment of the inventive H.D.A.

Hereinafter, an embodiment of the invention will be described in conjunction with the drawings. Referring to FIG. 1, a base plate 1 has a box shape provided with a breathing filter 7 having an orifice. The breathing filter effects exchange of air between the interior and the exterior of the base plate. An H.D.A. is disposed inside the base plate 1. A spindle 2 is provided to support a plurality of superposed magnetic discs 3 to rotate the same. An arm 4 is provided to hold a magnetic head 5 which is driven by a carriage 6 through the arm 4 to move over the magnetic discs 3 to effect recording and reproducing of information. A humidity adjustor case 8 is disposed in the common spacing which also contains the H.D.A., and contains a humidity adjustor 9. This humidity adjustor 9 operates to effect humidity control through an orifice 10 provided through the humidity adjustor case 8 and a filter 11.

In this embodiment, the humidity adjustor 9 is composed of silica gel, which is provisionally treated to retain a given amount of water. This water-containing silica gel is utilized to maintain a constant relative humidity around the H.D.A. Namely, this water-containing silica gel works to establish equilibrium at a given relative humidity. Accordingly, this water-containing silica gel functions to absorb moisture to establish the equilibrium condition when the humidity rises over a certain degree, and functions to release the moisture when the ambient humidity falls down. This equilibrium condition is determined by the water content of the silica gel and the interior relative humidity. This water content of silica gel is determined by the ratio of a weight of water contained in silica gel and a weight of dried silica gel. Generally, in view of the relatively small volume of the H.D.A. interior and the water content of silica gel, the water amount contained in the silica gel is significantly greater than the water amount contained in the space of the H.D.A so as normally to maintain a constant humidity ambience.

However, this ideal regulation is realized by the quick absorbing and releasing performance of the water-containing silica gel. Namely, this function must be effected instantly to substantially maintain a given relative humidity while abrupt temperature change occurs. Hereinafter, the term "response" is defined to refer to a time needed to absorb or release a differential amount of water to reach the equilibrium condition. Actually, the response depends on the inherent or specific feature of silica gel and the arrangement of the silica gel.

When the silica gel is disposed in a closed spacing as shown in FIG. 1, the absorption and release of moisture by the silica gel is effected at moderate speed, thereby hindering the response. Therefore, when the interior temperature varies in the H.D.A., actually the relative humidity changes. The adjusting function of the water-containing silica gel may not respond quickly to this change such that the humidity control is actually effected in a certain range. In view of the foregoing, the optimum water content of the silica gel should be suitably set so as to realize an acceptable range of the humidity change which is determined by the nature of the humidity adjustor used and its arrangement.

Figure 2A:
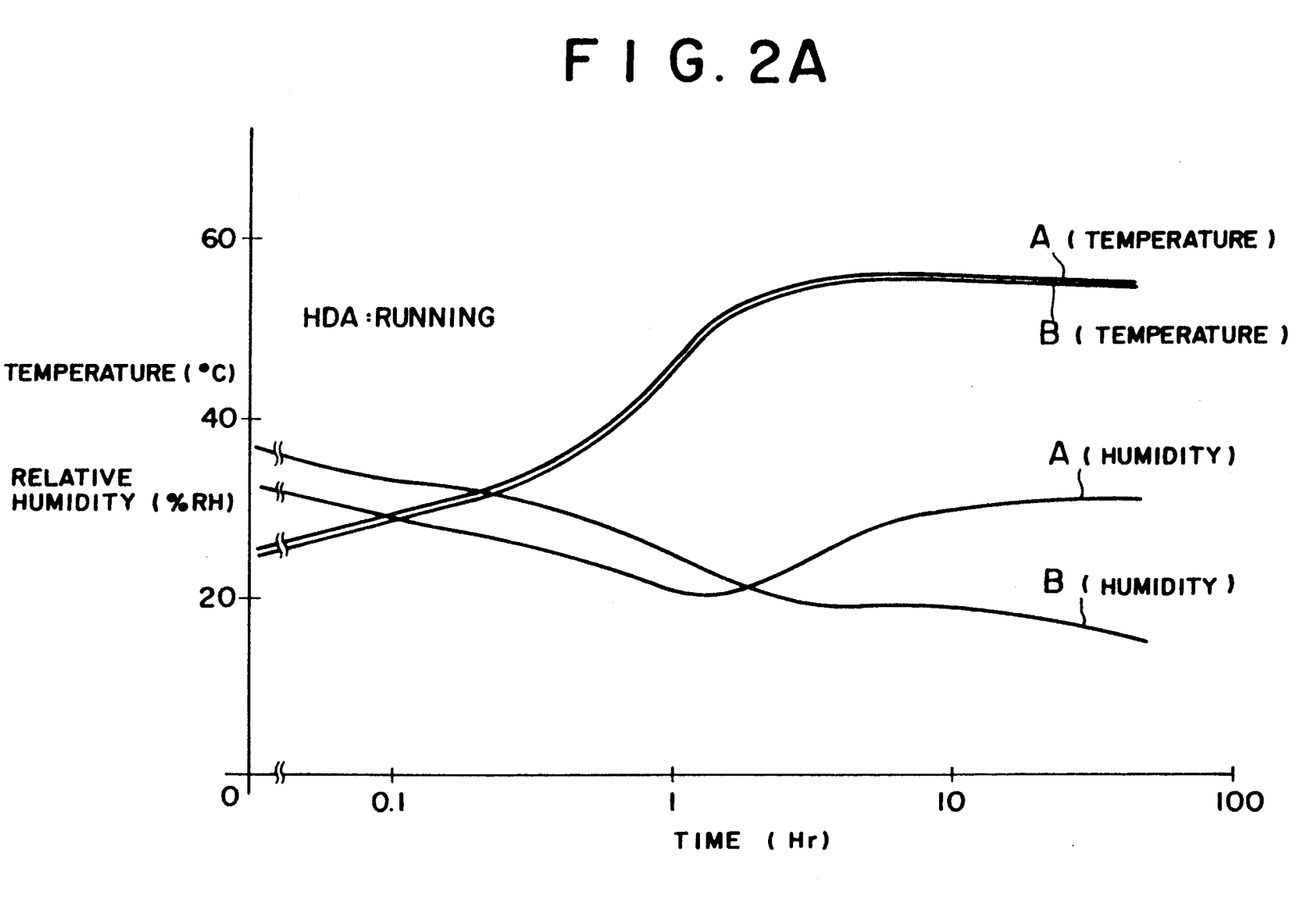
FIGS. 2A and 2B are graphs showing changes in temperature and humidity inside the H.D.A. during the course of operation thereof in terms of time.
Figure 2B:
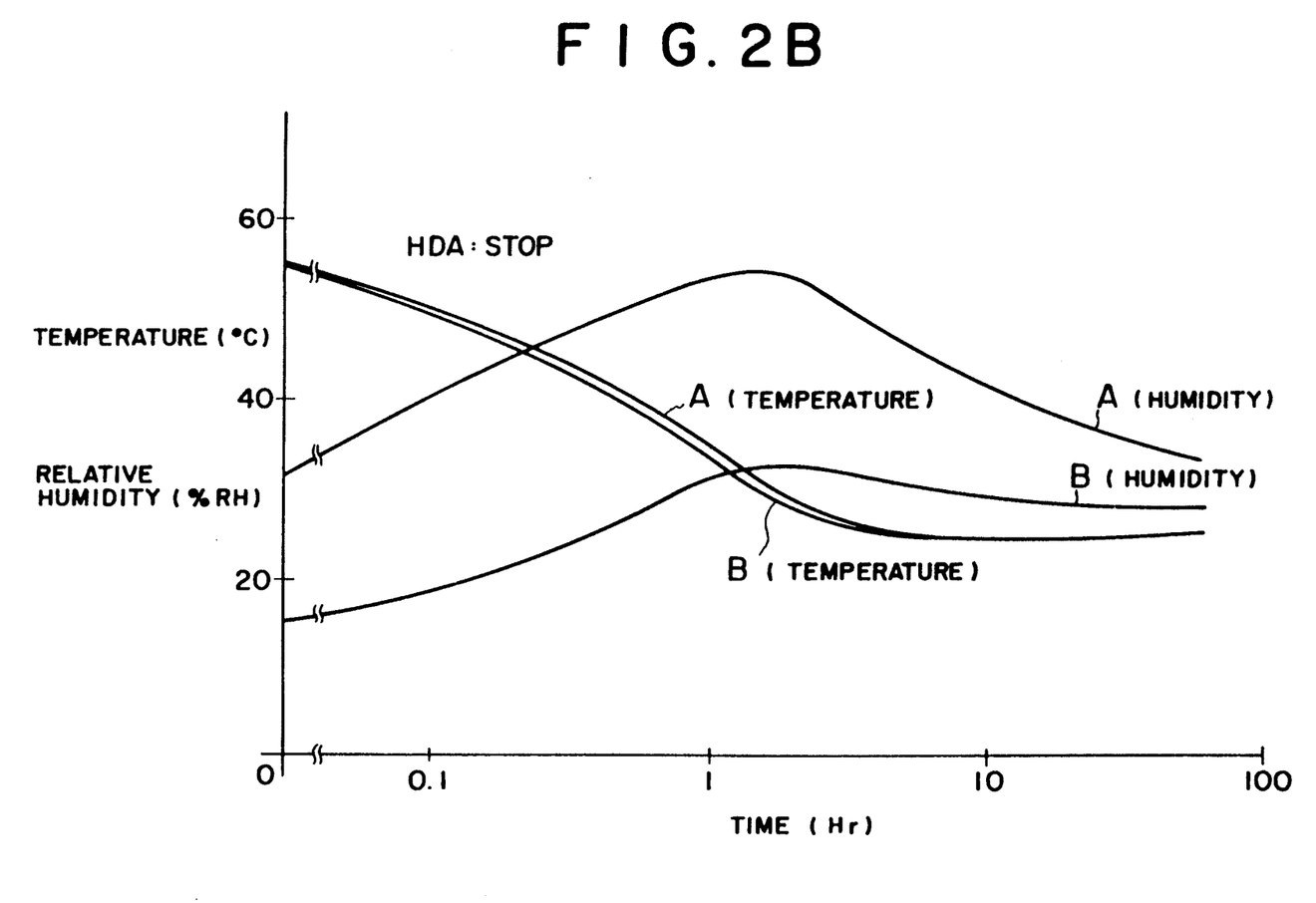

FIGS. 2A and 2B show changes of humidity and temperature measured in an H.D.A. which utilizes a humidity adjustor in the form of silica gel of a JIS standard A type which contains water at 17% by weight. The H.D.A. is initially held at approximately 25° C. When the H.D.A. starts operation, the disc medium starts rotating to raise the interior temperature of the H.D.A. Since the H.D.A. is highly sealed, moisture is not substantially exchanged between the inside and the outside. This measurement is conducted in two examples which have different sizes of the orifice 10 in the humidity adjustor casing 8 to differentiate air flow rate to set different responses.

FIG. 2A shows a result of the measurement conducted during a transient period from the start of the H.D.A. operation to a time when the interior temperature reaches a constant level. Example A has a single orifice 10 having a 20 mm diameter. In example A, the humidity gradually decreases while the temperature increases. Subsequently when the temperature approaches and then reaches the constant level, the humidity increases to reach the original level. Namely, example A has a certain response sufficient to prevent an over-dry or an over-wet condition, though not to perfectly follow the temperature increase.

On the other hand, the comparative example B has a single orifice 10 having a 0.6 mm diameter. This comparative example B has insufficient response so that the humidity cannot be returned to the original level even after a lengthy period.

FIG. 2B shows a result of the measurement conducted in a period after termination of the H.D.A. operation. In this measurement, example A shows a certain response of moderate degree to maintain finally about 30% RH. In turn, comparative example B has an insufficient response in only moderating the humidity change by the adjusting operation.

These measurement results clearly show that the greater the diameter of the orifice, the better the response. Namely, in order to improve the response, the size or number of orifices may be increased. However, if the size or number of orifices is increased excessively, merely in view of the improvement in the response, silica gel may generate dust which would dangerously affect performance of the H.D.A. Therefore, in practical use, efficiency of the orifice must be optimally set to obtain an optimum response while simultaneously preventing generation of dust. Example A has an optimum orifice diameter of 20 mm in view of the prevention of dust generation and in view of the sufficient response. The following description is directed to example A having a good response in the practical range.

The relative state between the head and the medium is classified generally into either a stationary state, a frictional state or a floating state. As described above, a significantly low humidity level is ideal to prevent clinging between the head and the medium surface in the stationary state. On the other hand, a relatively high humidity level is desired to prevent wearing and damage in the frictional state and in the floating state. These features are observed in conjunction with FIGS. 2A and 2B.

During the start time shown in FIG. 2A, the H.D.A. shifts from the stationary state through the frictional state to the floating state, in which the interior of H.D.A. reaches the stable condition. The interior humidity is determined by the initial water content of the silica gel. This set humidity should be as high as possible to the extent that clinging does not occur since the three above-described states develop under the set humidity. Then, when the H.D.A. starts operating, the interior temperature rises so that the humidity decreases to form a bottom peak due to a response delay of the humidity adjustor. During this course, the floating state normally emerges. However, the H.D.A. may occasionally stop so that the bottom peak humidity should be also as high as possible to the extent that clinging does not occur.

When the H.D.A. stops operating, the internal temperature falls so that the humidity rises to a top peak due to delay of the response of the humidity adjustor. When the top peak develops, the H.D.A. normally has been already stopped so that the head is placed in contact with the medium. The dry condition would be preferable in order to prevent clinging in this contact state. However, in this state the H.D.A. may occasionally restart the operation. Therefore, the humidity should be also held as high as possible while avoiding clinging.

In summary, the interior of the H.D.A. should be controlled at a certain humidity as high as possible to the extent where clinging never occurs.

Figure 3:
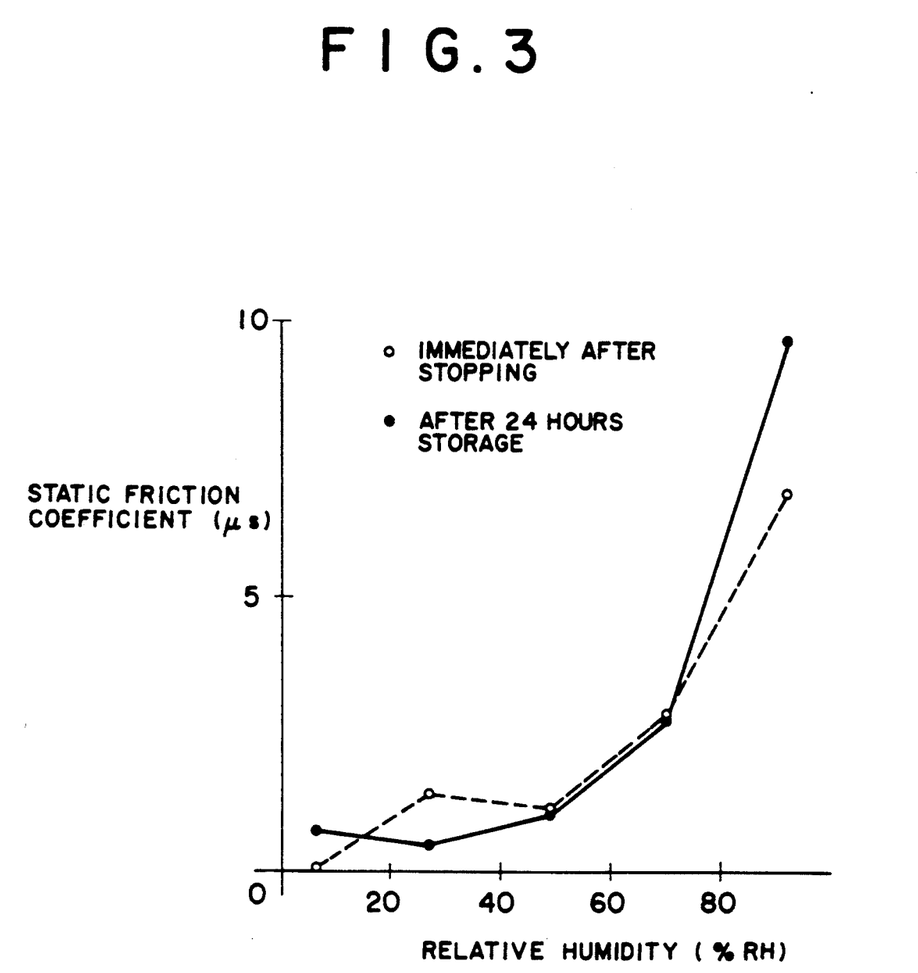
FIG. 3 is a graph showing the relation between the static friction coefficient and the relative humidity, measured when a disc medium comes in contact with a head.

The inventor has conducted measurements about clinging between a disc medium and a head, the results of which are shown in FIG. 3. This graph shows the relation between relative humidity and a static friction coefficient measured immediately after stopping the rotation of the medium, and also measured after storage of 24 hours. According to this graph, the static friction coefficient $\mu s$ increases above 50%-70% RH. In view of the plotted curves, clinging may be effectively avoided below 60% RH.

In example A, as shown by FIG. 2B, the highest humidity level is reached during the course of the temperature decreasing after stopping of the H.D.A. This highest humidity level at the peak should be set less than 60% RH. The measured peak humidity level was 55% RH in example A, which was effective to avoid clinging.

On the other hand, the lowest level of humidity is observed approximately at 20% RH during the operation of the H.D.A. (FIG. 2A). This level would be further decreased by 5% RH to 15% RH, dependent on the change in atmospheric factors, which is still advantageously lower than the prior art of less than 10% RH.

Figure 5:
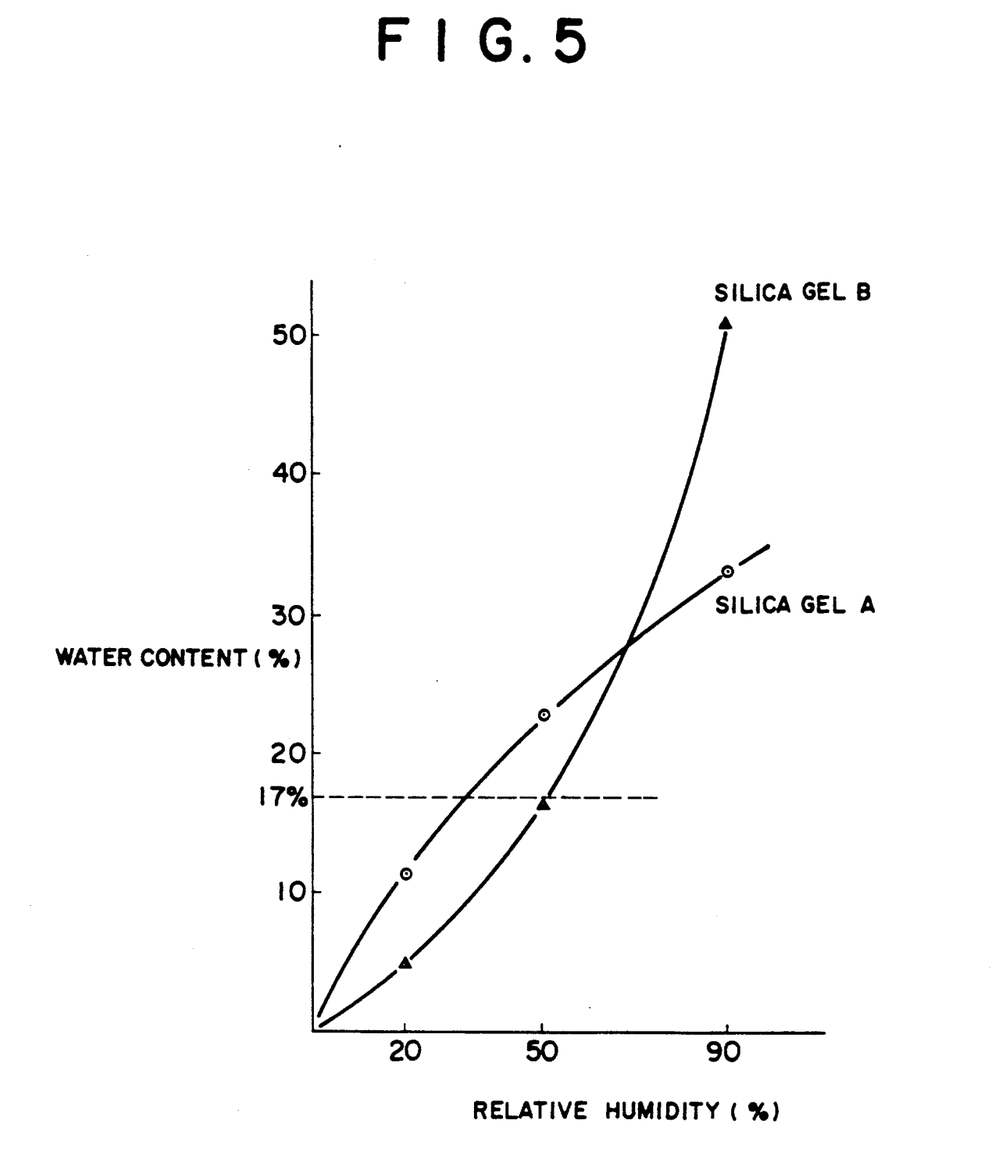
FIG. 5 is a graph showing a water-retaining characteristic of silica gel.

The aforementioned description is directed to the fact that the response varies according to the size of the orifice. As described above, the response also varies according to the nature of the moisture adjustor. For example, silica gel has various types, and the example A utilizes an A type according to the JIS standard (hereinafter, referred to as "silica gel A"). The response varies dependent on the type of silica gel. FIG. 5 shows the adsorption rate of the silica gel A and that of silica gel B determined as a B type according to the JIS standard with respect to relative humidity.

Referring to the humidity change in example A shown in FIGS. 2A and 2B, variations of the relative humidity are different while variations of the temperature are similar between the period when the interior temperature of the H.D.A. rises at the time of starting the H.D.A. operation and another period when the interior temperature decreases at the time of stopping the H.D.A. operation.

Referring back to FIG. 5, the silica gel A has a greater variation of the adsorption rate with respect to the variation of humidity degree in a relatively lower humidity range than in a relatively higher humidity range. Namely, the silica gel A having 17% of the water content at the stable state absorbs a greater amount of water when the relative humidity rises above a certain degree, and releases a smaller amount of water when the relative humidity decreases by the same amount. Therefore, the change in the relative humidity shown in FIGS. 2A and 2B can be well understood from the performance of the silica gel A.

On the other hand, the silica gel B has a performance in contrast to the silica gel A. Namely, the silica gel B has good response in a higher humidity range. Since the object of the invention is particularly to prevent an excessively dry condition, the silica gel A is preferable because of its good response in a lower humidity range. Generally, the inherent response of silica gel can be suitably regulated by mixing or concurrently using different types of silica gel.

As described above, the maximum water content of the silica gel must be determined according to various external factors or parameters such as ambient condition of the H.D.A. in practical use (temperature and humidity), thermal capacity of the H.D.A., packing arrangement of silica gel, the form of the humidity adjustor, and the possibility of clinging of the head to the medium. In summary, the water content is set according to the various parameters so as to effect prevention of clinging at the highest humidity and yet to maintain the highest humidity possible during the course of use. For example, according to the external condition in the above-described example, the relative humidity may vary about 35% RH range from 20% RH to 55% RH. On the other hand, the medium used and the head may cause clinging at 60% RH. In view of these considerations, the silica gel should hold 30% RH at the equilibrium state. Therefore, the water content of silica gel is optimally set to realize the equilibrium state at 30% RH. For example, the A-type silica gel of the JIS standard is adjusted at about 17% of water content to realize the optimum condition.

As described above, according to the invention, the magnetic disc apparatus is provided with a humidity adjusting means effective to maintain a constant humidity within the H.D.A. By such construction, there can be realized an improved magnetic disc apparatus effective to prevent clinging and effective to improve an anti-abrasion characteristic of the medium. Further, the humidity adjusting means is advantageously composed of silica gel containing provisionally a given amount of water so as to easily obtain an efficient humidity adjusting function.

What is claimed is:

1. A magnetic disc apparatus, comprising:
an enclosed head disc assembly; and
means for adjusting a humidity within said enclosed head disc assembly having silica gel being previously supplied with a predetermined amount of water before said silica gel is accommodated in position, and capable of releasing moisture by use of the supplied water to provide a predetermined humidity level such that when said humidity inside the head disc assembly rises above the predetermined humidity level, said humidity adjusting means becomes operative for absorbing moisture in the enclosed head disc assembly, and becomes inoperative when said humidity inside the enclosed head disc assembly drops to said predetermined humidity level, and
wherein said humidity adjusting means becomes operative, when said humidity inside the enclosed head disc assembly falls below the predetermined humidity level, for releasing moisture into the enclosed head disc assembly, and becomes inoperative when said humidity inside the enclosed head disc assembly increases to said predetermined humidity level.

2. A magnetic disc apparatus according to claim 1, wherein the silica gel contains a certain amount of water effective to maintain a relative humidity degree more than 15% RH in the head disc assembly during the course of operation of the magnetic disc apparatus.

3. A magnetic disc apparatus according to claim 1, wherein the humidity adjusting means comprises at least two kinds of silica gels containing provisionally a given amount of water and having a different performance.

4. A magnetic disc apparatus according to claim 1, wherein said silica gel has water content of about 17% by weight.

5. A magnetic disc apparatus, comprising:
an enclosure;
an enclosed head disc assembly; and
means for adjusting a humidity within said enclosed head disc assembly, said humidity adjusting means having silica gel being previously supplied with a predetermined amount of water before said silica gel is accommodated in said enclosure, and capable of releasing moisture by use of the supplied water to provide a preset humidity range such that when said humidity inside the head disc assembly rises above said preset humidity range, said humidity adjusting means becomes operative for absorbing moisture in the enclosed head disc assembly, and becomes inoperative when said humidity inside the enclosed head disc assembly drops within said preset humidity range, and wherein said humidity adjusting means becomes operative, when said humidity inside the enclosed head disc assembly falls below said preset humidity range, for releasing moisture into the enclosed head disc assembly, and becomes inoperative when said humidity inside the enclosed head disc assembly increases to be within said preset humidity range.

6. A magnetic disc apparatus according to claim 5, wherein said silica gel has a water content of about 17% by weight.

7. A magnetic disc apparatus according to claim 5, wherein said humidity adjusting means comprises at least two kinds of silica gels each containing previously a predetermined amount of water and having a different performance.

8. A magnetic disc apparatus according to claim 5, wherein said predetermined amount of water in the silica gel being an amount effective to maintain a relative humidity degree ranging from 15 to 60% RH in the head disc assembly.

* * * * *

UNITED STATES PATENT AND TRADEMARK OFFICE
CERTIFICATE OF CORRECTION

PATENT NO. : 5,293,286
DATED : Mar. 8, 1994
INVENTOR(S) : Akihiro HASEGAWA et al.

It is certified that error appears in the above-identified patent and that said Letters Patent is hereby corrected as shown below:

On the title page: Inventors:   at Item [75], delete "Akihoro" and insert --Akihiro--.

In the ABSTRACT, line 1, after "of", insert --an--;

In the ABSTRACT, line 3, delete "degree";

In the ABSTRACT, line 7, delete "degree".

Signed and Sealed this

Twenty-sixth Day of July, 1994

Attest:

BRUCE LEHMAN

*Attesting Officer*     *Commissioner of Patents and Trademarks*